(12) United States Patent
Fisher (10) Patent No.: US 7,584,982 B2
(45) Date of Patent: Sep. 8, 2009

(54) MOVEABLE HITCH WITH STRESS-FREE ELEVATED BEARING GUIDE

(75) Inventor: Benjamin D. Fisher, Eau Claire, WI (US)

(73) Assignee: Curt Manufacturing, Inc., Eau Claire, WI (US)

( * ) Notice: Subject to any disclaimer, the term of this patent is extended or adjusted under 35 U.S.C. 154(b) by 90 days.

(21) Appl. No.: 11/758,430

(22) Filed: Jun. 5, 2007

(65) Prior Publication Data

US 2007/0290481 A1 Dec. 20, 2007

Related U.S. Application Data

(60) Provisional application No. 60/810,992, filed on Jun. 5, 2006.

(51) Int. Cl.
*B62D 53/06* (2006.01)
(52) U.S. Cl. ............... 280/438.1; 280/433; 280/441
(58) Field of Classification Search ............. 280/438.1, 280/433, 407.1, 441
See application file for complete search history.

(56) References Cited

U.S. PATENT DOCUMENTS

| | | | |
|---|---|---|---|
| 5,044,651 A | 9/1991 | Weikel | |
| D325,025 S | 3/1992 | Sueyoshi et al. | |
| 5,449,191 A | 9/1995 | Cattau | |
| 5,509,682 A | 4/1996 | Lindenmann et al. | |
| 5,516,137 A | 5/1996 | Kass et al. | |
| 5,529,329 A | 6/1996 | McCoy | |
| D378,077 S | 2/1997 | Lindenmann et al. | |
| D380,719 S | 7/1997 | Lindenmann et al. | |
| 5,707,070 A | 1/1998 | Lindenmann et al. | |
| 5,772,229 A * | 6/1998 | Cattau | 280/438.1 |
| 5,839,745 A | 11/1998 | Cattau et al. | |
| D423,998 S | 5/2000 | Lindenmann et al. | |
| 6,170,851 B1 | 1/2001 | Lindenmann et al. | |
| 6,247,720 B1 | 6/2001 | Linger et al. | |
| 6,357,777 B1 | 3/2002 | Linger et al. | |
| 6,386,570 B2 | 5/2002 | Linger et al. | |
| 6,398,249 B1 | 6/2002 | Lindenmann et al. | |
| 6,467,791 B1 | 10/2002 | Fandrich et al. | |
| 6,485,045 B1 * | 11/2002 | King | 280/417.1 |
| 6,502,846 B2 | 1/2003 | Fandrich et al. | |
| 6,520,528 B2 | 2/2003 | Fandrich et al. | |
| 6,557,883 B2 | 5/2003 | Linger et al. | |
| 6,682,089 B2 | 1/2004 | McCoy et al. | |
| 6,685,210 B2 * | 2/2004 | Lindenman et al. | 280/441 |
| 6,726,396 B2 * | 4/2004 | Plett | 403/365 |
| 6,851,695 B2 | 2/2005 | Lindenmann et al. | |
| 6,942,236 B2 | 9/2005 | Lindenmann et al. | |
| 7,100,935 B1 * | 9/2006 | Dunbar | 280/433 |
| 7,222,872 B1 * | 5/2007 | Bauder | 280/439 |

(Continued)

*Primary Examiner*—Lesley D Morris
*Assistant Examiner*—Tashiana Adams
(74) *Attorney, Agent, or Firm*—Shewchuk IP Services, LLC; Jeffrey D. Shewchuk (57) ABSTRACT

A bearing guide for a hitch allows lateral movement of the hitch. The bearing guide is elevated relative to the bearing surface. Two trucks roll on wheels each about their own elevated guide for fore-and-aft rolling of the hitch point. The bearing guide also provides a keyway which receives a locking key. The locking key is supported on both sides of the keyway by a plunger control rod, and can be unlocked by pulling and rotating a handle. When the towing vehicle is driven to relocate the hitch point, the locking key reengages itself into a different keyway on the bearing guide.

15 Claims, 9 Drawing Sheets

U.S. PATENT DOCUMENTS

| | | | |
|---|---|---|---|
| 2003/0034631 A1* | 2/2003 | Lindenman et al. | 280/438.1 |
| 2003/0160429 A1* | 8/2003 | McCoy et al. | 280/433 |
| 2005/0146116 A1* | 7/2005 | Lindenman et al. | 280/433 |
| 2005/0167944 A1* | 8/2005 | Audo et al. | 280/433 |

* cited by examiner

MOVEABLE HITCH WITH STRESS-FREE ELEVATED BEARING GUIDE

CROSS-REFERENCE TO RELATED APPLICATION(S)

This application claims priority from provisional application No. 60/810,992, filed Jun. 5, 2006, incorporated herein by reference.

BACKGROUND OF THE INVENTION

The present invention relates to trailer hitches, and particularly to hitches which allow movement of the hitching point, such as fore and aft adjustability of a fifth wheel hitch. Hitches have long been used to attach a towed load, such as a trailer, to a towing vehicle such as a tractor or a truck. Most hitches permit the towed load to pivot in its orientation relative to the towing vehicle about a generally vertical axis, such as when the towing vehicle turns a corner. For some hitches, the hitching point which establishes the pivot axis of the hitch is a ball supported on the towing vehicle. For other hitches such as fifth wheel hitches, the hitching point which establishes the pivot axis is a kingpin extending from the towed load. In either situation, large forces are frequently transmitted through the hitching point, not only pulling rearwardly due to the drag of the towed load during towing, but also forward, up, down and sideways during slowing or stopping, towing up and down hills, traveling on sideslopes or around corners, traversing over bumpy roads, etc.

For many applications, the hitching point can be fixed relative to the towing vehicle, and never change. For other applications, adjustment of the location of the hitching point relative to the towing vehicle occurs infrequently, such that a mechanical repositioning by hand is appropriate. For example, many hitches have two or more sets of mounting holes, so as to be adjustable in their position by changing the set of mounting holes used with the mounting bolts. For some applications, however, frequent and easy changing of the location of the hitching point is desirable, and particularly laterally moving the hitching point (i.e., moving the hitching point forward, backward, to the left, or to the right on the hitching vehicle.) A common use of such lateral movement is to enable tighter turning during parking (i.e., providing greater clearance between the trailer and the cab of the towing vehicle), and then repositioning the hitching point for towing at highway speeds. The present invention is particularly directed at enabling such lateral movement of the hitching point of a hitch.

The hitch must be strong to securely engage the trailer, minimizing the possibility of breakage or of any way the trailer could inadvertently come loose. At the same time, the hitch should be simple to operate, so the operator has no difficulty in intentionally moving the location of the hitching point. Operation of the controls should not require the application of excessive force or torque. The average operator of a fifth-wheel or gooseneck hitch is not young, such as over 55 years old, who is perhaps not as strong and nimble as he or she once was. The controls of the hitch should be readily accessible by the operator, without requiring too much climbing or bending to access. The hitch should preferably be mechanically operated, so there is no possibility of a loss of power preventing operation of the hitch.

Towing conditions are such that hitches are normally subjected to considerable amounts of dirt and grime, and treated very roughly. The hitch should readily withstand such conditions. The hitch must be robust and reliable, to last for carefree operation over the life of at least one vehicle, and possibly over the life of several vehicles, despite the fact that the hitch will likely be openly exposed to weather over its years or decades of use. As much as possible, the hitch should also have minimal cost and expense in manufacturing and assembly. In keeping with these objectives, further improvements to hitch designs permitting lateral movement of the hitching point are possible.

BRIEF SUMMARY OF THE INVENTION

The present invention is a hitch and a bearing guide for a hitch. In one aspect, the hitch is laterally moveable over a bearing surface, and the bearing guide includes a guide which is elevated relative to the bearing surface. In the preferred embodiment, the elevated guide is provided by a bar which is centered over wheels for the fore-and-aft rolling of the hitch point. In another aspect, the bearing guide also provides a keyway which receives a locking key. The locking key is supported on both sides of the keyway, and can be unlocked by pulling and rotating a handle. When the towing vehicle is moved a few feet to relocate the hitch point, the locking key reengages itself into a different keyway on the bearing guide.

The locking key is preferably tightly spaced relative to the axis of a plunger control rod, minimizing bending moments on the locking key during braking and during maneuvering towing.

While the above-identified drawing figures set forth one or more preferred embodiments, other embodiments of the present invention are also contemplated, some of which are noted in the discussion. In all cases, this disclosure presents the illustrated embodiments of the present invention by way of representation and not limitation.

Numerous other minor modifications and embodiments can be devised by those skilled in the art which fall within the scope and spirit of the principles of this invention.

DETAILED DESCRIPTION

Figure 1:
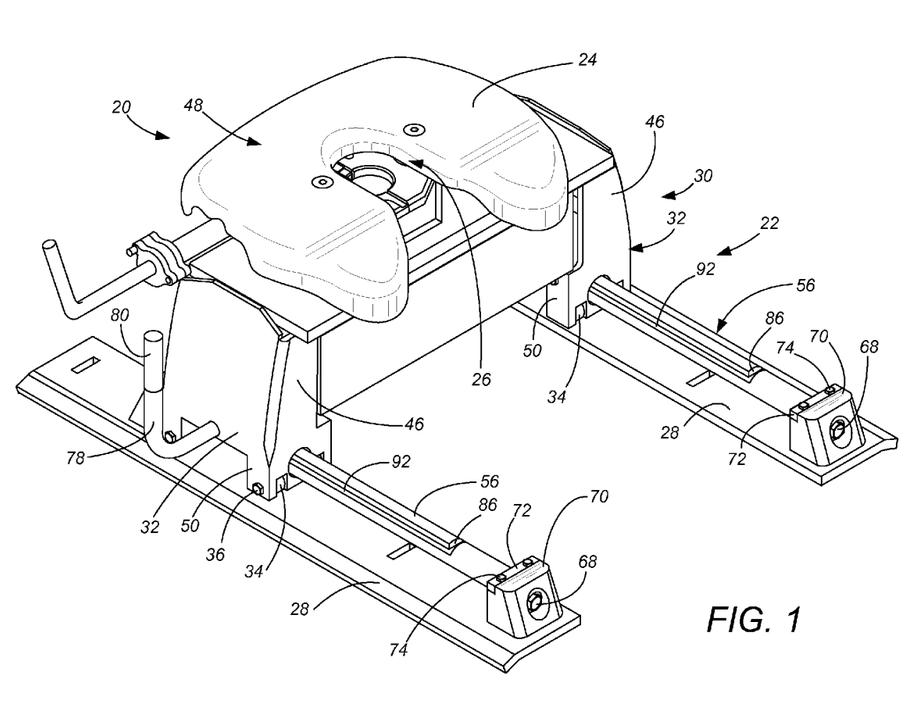
FIG. 1 is a perspective view from above showing a preferred embodiment of a hitch in accordance with the present invention.
Figure 2:
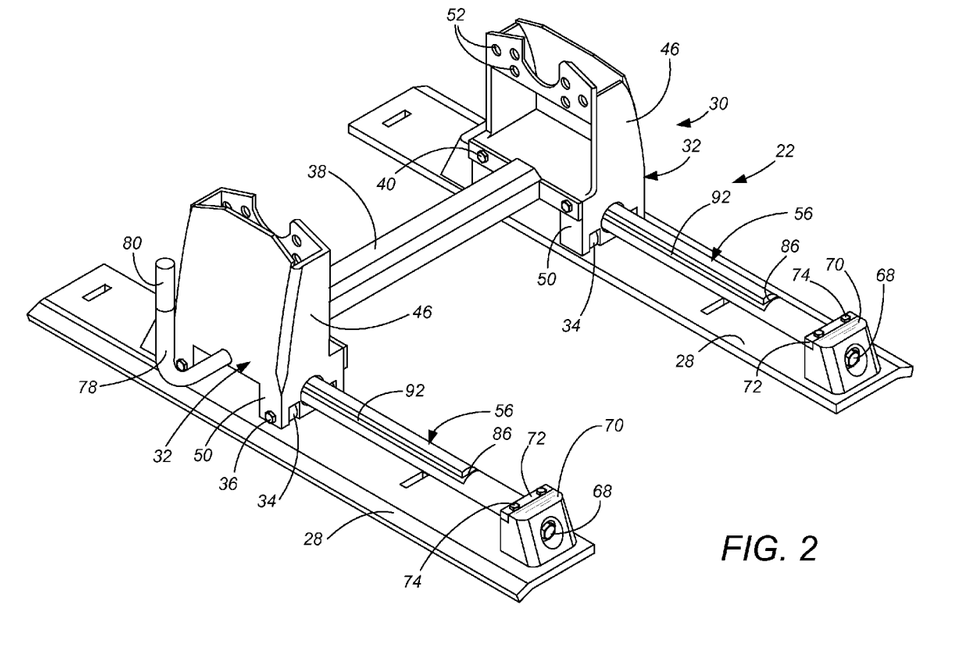
FIG. 2 is a perspective view of the bearing guides of FIG. 1 with the hitch structure removed.

As shown in FIG. 1, a preferred embodiment of a hitch 20 in accordance with the present invention includes a bearing guide structure 22 which permits attachment of the hitch 20 into the bed of a pick-up truck (not shown) or onto the frame of a towing vehicle. In the preferred embodiment as shown in FIG. 1, the hitch 20 is a fifth wheel hitch.

In a fifth wheel hitch, a skid plate 24 provides the top surface of the hitch 20 and defines a king-pin receiving slot 26. The skid plate 24 may embody an ornamental design such as described in U.S. patent application Ser. No. 29/257,292, assigned to the assignee of the present invention and incorporated by reference. The hitch 20 may include a kingpin retention structure such as described in U.S. patent application Ser. Nos. 11/395,616 and 11/395,340, assigned to the assignee of the present invention and incorporated by reference. Alternatively, many other types of hitches could be supported by the bearing guide structure 22 of the present invention.

In such fifth wheel hitches, fore and aft movement of the hitch 20 is beneficial to move the hitching point defined by the king-pin receiving slot 26 between a rearward position, which is commonly used for tight maneuverability of the trailer such as during parking, and a forward position that better locates the load during highway speed towing. While the invention is described with reference to fore-and-aft movement, the invention is equally applicable to any direction of lateral movement including side to side positioning of the load. While the invention is described with reference to a fifth wheel hitch 20, the invention is equally applicable to other types of hitches, such as goose neck hitches or ball hitches, where lateral repositioning of the hitching point 26 is desirable.

As better shown in FIGS. 2-7, the bearing guide structure 22 includes a base which could be provided as a single sheet but more preferably has two bearing plates 28. A frame structure 30 is moveable in the fore and aft direction on the bearing plates 28. In the preferred embodiment, the frame structure 30 includes a rolling block or truck 32 riding on each of the bearing plates 28. Each truck 32 includes a plurality of rollers 34 to minimize friction when the frame structure 30 is moved between the fore (highway towing) position and the aft (tight maneuvering) position. The rollers 34 are preferably formed of cylindrical wheels, ball-bearing mounted on axles such as shoulder bolts 36, having significant contact area with the bearing plates 28. Alternatively to reduce cost, the rollers 34 may be directly mounted without ball bearings. For instance, the wheels 34 can be formed of 4140 cold rolled steel which has been zinc plated, or may be formed of a corrosion resistant metal alloy. Such wheels 34 resist corrosion damage to smoothly roll over years of use and abuse. For instance, the preferred trucks 32 each have four wheels 34, with each wheel 34 having nearly ½ inch of widthwise contact with the bearing plates 28, which helps to spread out the load due to the weight of the moving portion of the hitch 20 and the trailer load, both of which can be magnified as impact loads during towing over rough roads. The four sets of wheels 34 provided in the preferred frame structure 30 should have significant side-to-side and front to back spacing as well, to withstand the moments imparted to the hitch 20 during towing over sloping roads, around corners, etc. For instance, in the preferred embodiment, the front and rear wheels 34 of each truck 32 are separated by about 6 inches, and the right and left trucks 32 are spaced about 21 inches from each other. This spacing gives the frame 30 good four point stability (each point including a set of two wheels 34), enabling the wheels 34 to withstand, without damage, the considerable forces which will be encountered over years of towing use.

While the preferred embodiment uses a bearing structure with wheels or rollers 34 for ease of fore and aft repositioning, other bearing structures could alternatively be used. As one example, if the hitch 20 will be used with extremely heavy loads which cannot be effectively bourn by wheels 34, a lubricated slide plate (not shown) may be provided as the bottom surface of each of the trucks 32 riding on the bearing plates 28.

Each wheel 34 or each set of wheels 34 preferably includes an axle such as a bolt 36 which is attachable and detachable using tools such as wrenches (not shown). Further, the front set of wheels 34 is preferably accessible on the front of the truck 32, and the rear set of wheels 34 is preferably accessible to the rear of the truck 32. By having the wheels 34 and axles 36 be tool-detachable from the truck 32 and accessible, each wheel 34 and each axle 36 is independently replaceable should damage to one of the wheels 34 or axles 36 occur.

A cross-member 38 may be used to attach the two trucks 32 to each other, attached to each truck 32 such as by bolts 40. The preferred cross-member 38 also serves as a cover for the control rod 42 to prevent impact or damage to the control rod 42.

Mounting tabs 44 may be secured to the bearing plates 28 to facilitate attachment of the hitch 20 to the towing vehicle. Many other structures can be equivalently used for attaching the hitch 20 to the towing vehicle.

Each truck 32 includes a mounting superstructure 46 for mounting of the hitch structure 48 thereto. In the preferred embodiment, the trucks 32 are cast from ductile iron including both the lower slide block 50 and the mounting superstructure 46. Bolt holes 52 are provided in the mounting superstructure 46 for attachment of the hitch structure 48. The hitch structure 48 may include multiple bolt holes, or the mounting superstructure 46 may include multiple bolt holes 52, so the hitch structure 48 can be mounted in any of several positions relative to the frame structure 30.

Additionally, the mounting superstructure 46 may be used to support a variety of hitch structures. With the preferred mounting superstructure 46 shown, the bearing guide may be used not only with fifth wheel hitches from CURT Manufacturing (Eau Claire, Wis.) (such as that shown in FIG. 1), but also with fifth wheel hitches marketed by Valley Industries (Madison Heights, Mich.), and Reese Products (Elkhart, Ind.) and/or Cequent Towing (Plymough, Mich.).

The frame structure 30 includes an opening 54 for at least one guide 56. In the preferred embodiment, two guides 56 are used, with one guide 56 suspended over each bearing plate 28. Each truck 32 is provided with its own guide opening 54, with the preferred arrangement including a guide opening 54 at the front of the truck 32 and a guide opening 54 at the back of the truck 32, with an undercarriage 58 of the truck 32 having a clearance area from the guide 56. The guide openings 54 are preferably centered side-to-side over the sets of wheels 34, each guide opening 54 having a length approximately equal to the diameters of the wheels 34. In the preferred embodiment, each guide opening 54 is about 1½ inch long, while each wheel 34 is about 1¼ inch in diameter, so the trucks 32 slightly overhang the front and back of each wheel 34 to protect the wheel 34 from impact or damage.

Figure 7:
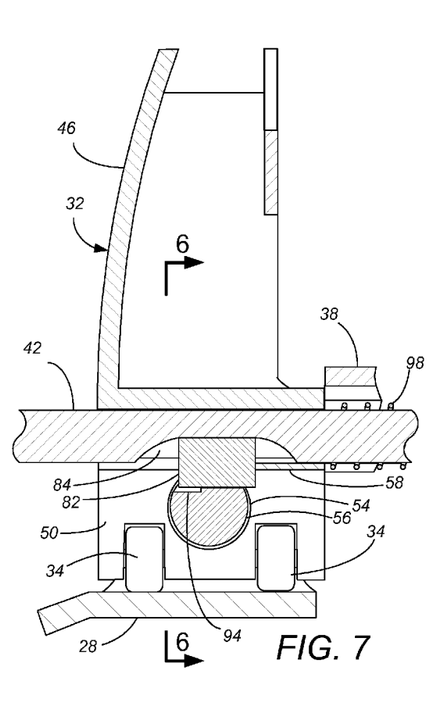
FIG. 7 is a cross-sectional view of the driver side bearing guide, taken along lines 7-7 in FIGS. 4 and 6.
Figure 8:
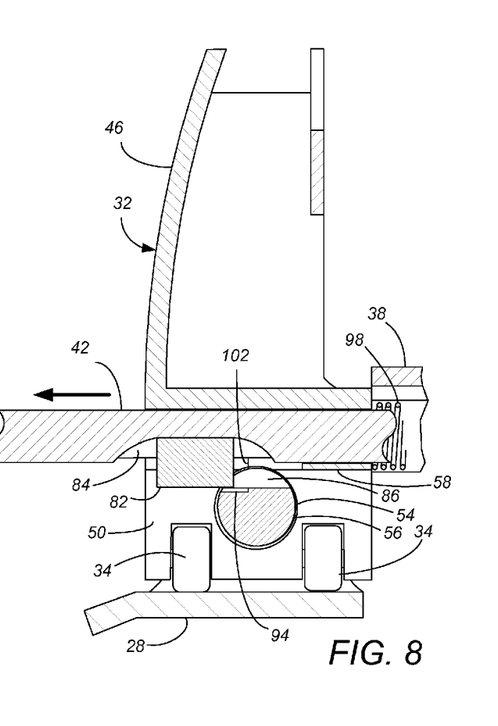
FIG. 8 is a cross-sectional view similar to FIG. 7 showing retraction of the lock bar to release the hitch for lateral movement.

As best shown in FIG. 7, the guide openings 54 preferably have a circular cross-sectional shape to match the circular cross-sectional shape of the guides 56. Such a circular opening 54 is inexpensive to form in the cast truck bodies during casting, but otherwise could be provided such as by drilling or reaming. The guide openings 54 should preferably leave considerable clearance from the guides 56, to ensure that in normal operation there is no stress bourn by the guide 56. The entire weight of the frame 30 and hitch structure 48, together with the downward force of the towed load, should be supported by the wheels 34 on the bearing plates 28, with none transferred to the guides 56. As one example, the bearing plates 28 may be slightly out of plane, or may bow slightly under the weight of the load. The clearance between the guide 56 and the guide openings 54 should account not only for manufacturing tolerances, but also for any relative curvature between the bearing plate 28 and the guide 56, as well as for any dirt or corrosion build-up. In the preferred embodiment, the guide openings 54 are manufactured about 0.12 inches greater in diameter than the guides 56, leaving ample clearance in use while still serving the guiding purpose. The guides 56 can be formed, for instance, of 4140 heat treated steel.

Several features with regard to this arrangement of guides 56 and guide openings 54 play important rolls in the robust usability of the hitch 20. First, the weight of the hitch 20 and the downward load is entirely bourn by the wheels 34 on the bearing plates 28, with none of the weight of the hitch 20 or downward load transferred to the guides 56. In this arrangement, the guides 56 generally only transfer side-to-side forces to the trucks 32, maintaining alignment of the trucks 32 in a stress-free way. Only if the towing vehicle hits a bump so severe as to throw the load and hitching structure 48 upward off the base 28 will the guides 56 impart a vertical force to the trucks 32 to hold the trucks 32 downward onto the bearing plate 28. Without having to bear the weight of the hitching structure 48 and the towed load, damage to the guides 56 is much less likely than if the weight or the hitching structure 48 and the towed load were transferred to the guide 56.

Figure 13:
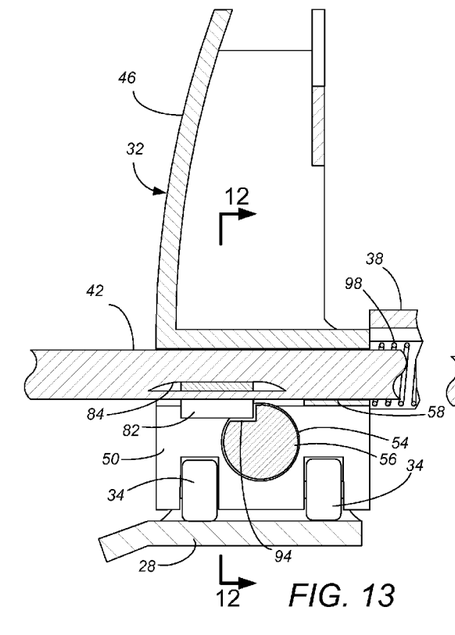
FIG. 13 is a cross-sectional view similar to FIGS. 7 and 8 during lateral movement of the hitch to the front end of the bearing guide, taken along lines 13-13 from FIG. 12.
Figure 14:
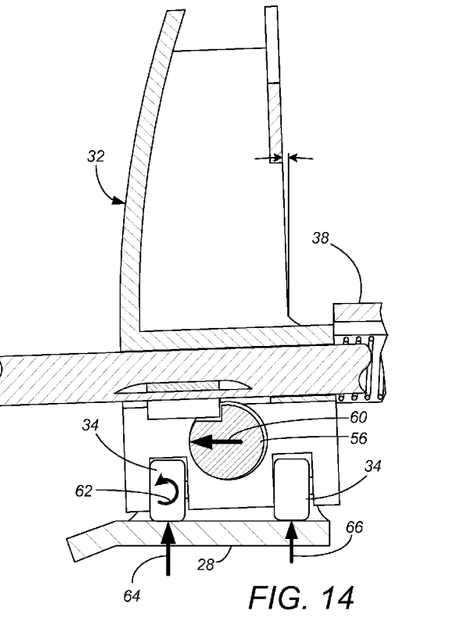
FIG. 14 is view similar to FIG. 13, showing an exaggerated "lean effect".

Second, the guide 56 is positioned at an elevated relationship relative to the bearing surface defined by the bearing plate 28, best shown with reference to FIG. 13 and the arrows 60, 62, 64, 66 in FIG. 14. In FIG. 13, the truck 32 is traversing down the guide 56, centered on the guide 56. In FIG. 14, the truck 32 is traversing down the guide 56, but has gotten out of alignment on the guide 56 so the guide 56 is placing a sideways force 60 on the truck 32. By being elevated relative to the bearing surface, any sideways force 60 imparted from the guide 56 to the truck 32 has a moment 62 over the bearing plane. That is, if the truck 32 and the guide 56 are pushing on each other, the force 60 from the guide 56 tends to cause the truck 32 to slightly "lean" relative to the bearing plane, not merely slide relative to the bearing plane. The "slightly leaning" truck 32 tends to "curve" in its path inward as it is moved down the guide 56, i.e., tends to correct the truck's position relative to the guide 56 by rolling rather than by sliding laterally. In practice any true "leaning" of the truck 32 is visually imperceptible, both because the trucks 32 are held against leaning by the superstructure 46 and hitch structure 48 and the cross-member 38, and because the wheels 34 have no suspension relative to the truck 32, the "leaning effect" still places a different force distribution on the wheels 34 as shown with differently sized vertical force arrows 64, 66 in FIG. 14. Because of this "leaning effect" force distribution of the truck 32 when the elevated guide 56 is imparting a sideways force 60, the truck 32 is less likely to bind on the guide 56 even after years of use.

In the preferred embodiment, the guide 56 is about 1½ inch in diameter, with its centerline elevated about 1⅝ inch over the top surface of the bearing plate 28 (leaving about ⅞$^{th}$ inch clearance between the top surface of the bearing plate 28 and the bottom surface of the guide 56). Even the 1⅝ inch elevation of the guide 56 however is significant in imparting the "lean effect" moment 62 to the truck 32 rather than a strictly sideways force if the guide 56 were centered at the bearing plane or the "reverse lean" imparted if the guide 56 were beneath the bearing plane.

Third, by centering each guide 56 right to left over each set of wheels 34, the leaning effect of the truck 32 is maximized. That is, the moment 62 caused by the guide 56 when pushing sideways on the truck 32 tends to load one wheel 34 and unload the other wheel 34 as shown by the different sized force arrows 64, 66 in FIG. 14, so the curving application of the "lean effect" is maximized to reduce the possibility of binding. Though no guide arrangement can totally eliminate the possibility of the hitch 20 binding against lateral movement, it is believed that, with the elevated guides 56 of the present invention, the hitch 20 binds significantly less against lateral movement than prior art guide arrangements.

The preferred guide 56 is a bar, circular in cross-section, but other shapes of guides can alternatively be used. The preferred guide 56 is formed of solid alloy steel for strength and plated for corrosion resistance, but other materials could alternatively be used.

Each guide 56 is mounted with a bolt 68 to a guide bracket 70 at the fore and aft ends of the bearing plate 28. Additionally, the preferred arrangement includes a retaining plate 72 attached by bolts 74 to each guide bracket 70, with each retaining plate 72 extending over an end of a guide 56. By having the guides 56 be tool-detachable from the guide brackets 70, each guide 56 is independently replaceable should damage to one of the guides 56 occur. Further, each guide 56 can be machined out of alloy steel bar stock, reducing the cost of manufacture and assembly of the hitch unit 20.

The bearing plates 28 and the guide brackets 70 can be formed from steel plate stock or cast, such as from 1045 steel. Whatever material is used for the bearing plates 28, it should have a similar coefficient of thermal expansion to the material of the guides 56. The hitch 20 is used in outdoor conditions encountered across the country, i.e., in temperatures from about −40° to 110° F., and thermal expansion of the hitch 20 should not cause any buckling or deflection of the guides 56. If desired, the bearing plates 28 and guide brackets 70 can be coated such as with a powder coating for ornamental appearance and corrosion resistance.

The guide brackets 70 are preferably permanently secured to the bearing plates 28 such as by welding or casting. Repositioning of the hitch structure 48 relative to the base 28 typically occurs by unlocking the unit 20 as will be described particularly with reference to FIGS. 6-13 and driving the towing vehicle either forward or backward with the towed load attached to the hitch 20. Once the vehicle has been driven the full length of the guides 56, the trucks 32 will slam into the guide brackets 70 before beginning to move the towed load. By having such a secure attachment between the bearing plates 28 and the guide brackets 70, the guide brackets 70 can serve as stops for the trucks 32 of the frame 30 once the frame 30 has reached its full range of travel.

The front guide brackets 70 in particular should be very strong. During towing at highway conditions, the frame 30 will ordinarily be at the fore position, with the trucks 32 butted up against the front guide brackets 70. During braking, the front guide brackets 70 will ordinarily transmit the full braking force from the towing vehicle to the hitch 20. Under no circumstances would it be permissible to have any of the guide brackets 70 break off from the bearing plates 28, or the guides 56 break off from the guide brackets 70, as such an occurrence could lead to a truck 32 breaking away from the towing vehicle, which could result in a runaway trailer or otherwise dangerously unsecured load.

The body of each truck 32 and the mounting tube 54 may be formed of hot rolled or cold formed steel, or cast iron, or of any of a wide variety of other strong, robust materials. The similar to the base 28, the trucks 32 can be coated such as with a powder coating or plating for ornamental appearance and corrosion resistance.

The bearing guide 56 includes a lock 76, which is instrumental in the operation of the hitch 20. With the lock 76 engaged, lateral movement of the hitching point 26 is not possible. Disengaging the lock 76 is necessary for moving the hitching point 26 from the fore (towing) position to the aft (tight maneuvering) position and back again, but the lock 76 should always be engaged during towing.

Figure 3:
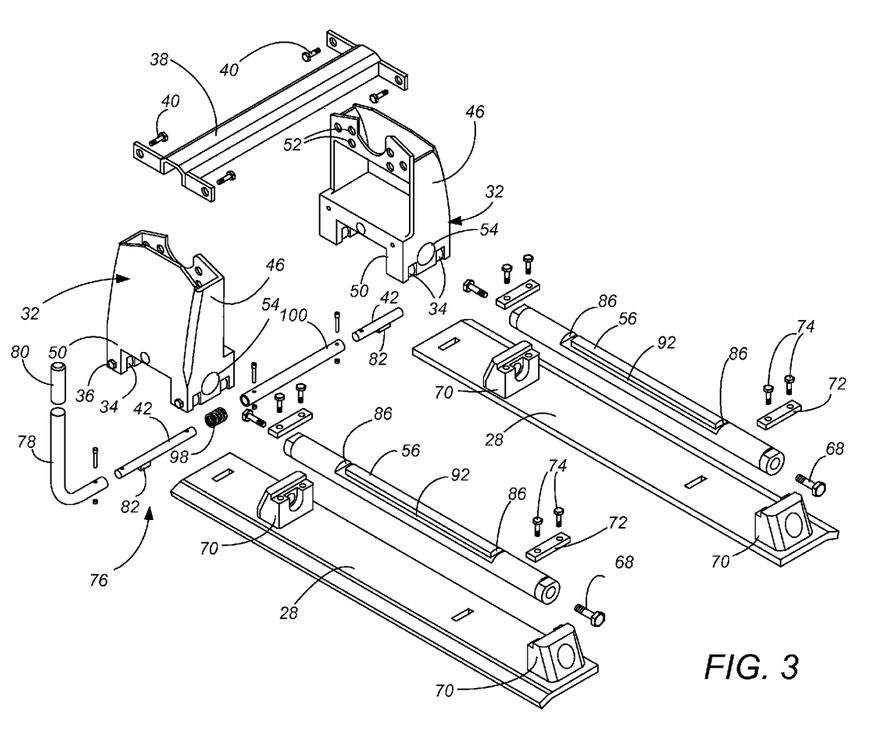
FIG. 3 is an exploded perspective view of the bearing guides of FIG. 2.
Figure 4:
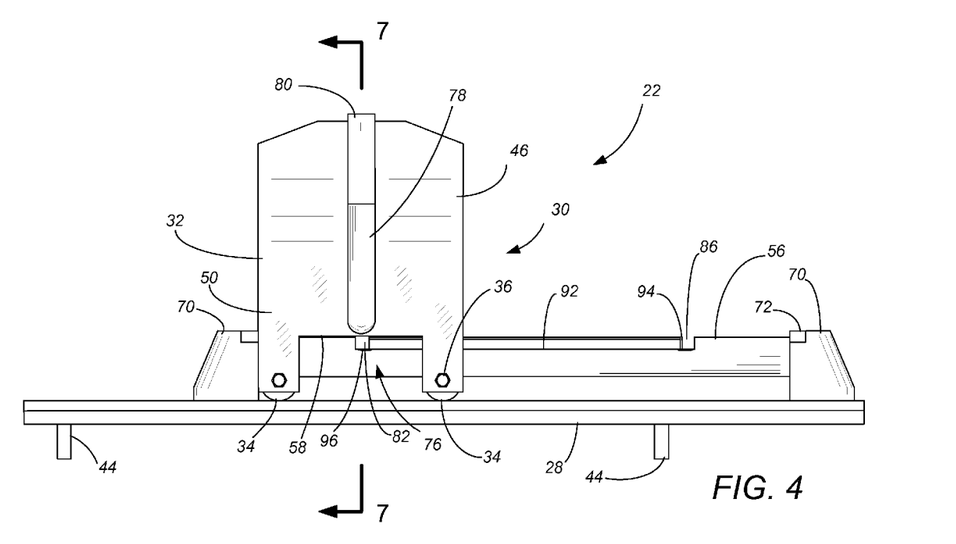
FIG. 4 is a side elevational view of the bearing guides of FIG. 2.
Figure 5:
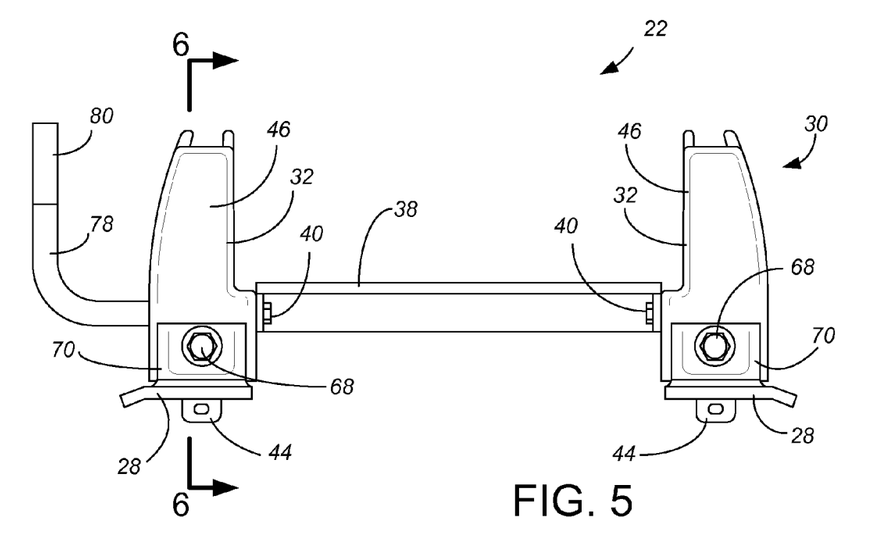
FIG. 5 is a front elevational view of the bearing guides of FIGS. 2 and 4.

The preferred lock 76 includes a handle 78 which facilitates single handed operation. The handle 78 extends from a plunger bar 42. Preferably the handle 78 extends to the driver's side of the towing vehicle. If desired, the handle 78 and plunger bar 42 can be made as an assembly (such as connected by pins as shown in FIG. 3) for ease of manufacturing, including covering the handle 78 with a grip 80.

The preferred lock 76 is supported through each of the trucks 32 extending under the cross-member 38, such that the preferred lock 76 moves with the frame 30. It is noted however, that a reversal of parts is possible, such that the handle 78 is supported through the base 28 and does not move with the frame 30. The plunger bar 42 includes a rigidly attached key 82 for each guide 56, best seen in FIGS. 3 and 6-13. While a single key could be provided, or the key could engage structure on the base 28 other than the guides 56, the preferred arrangement minimizes the considerable forces required for the keys 82 to positively lock each truck 32 in position.

Each key 82 is preferably provided by a rectangular insert which is welded into a mating slot 84 machined in the plunger bar 42. The preferred plunger bar 42 is cylindrical bar stock of about ¾ inch in diameter. The preferred key 82 is about 1½ long (matching the width of the guides 56), about 1 inch tall, and about ½ inch thick. The preferred slot 84 in the plunger bar 42 is about ⅜ inch deep, so the key 82 projects out of the plunger bar 42 by about ⅝ inch. At a ½ thickness and with the preferred rectangular key 82 projecting straight downward, the leading and trailing corners of the key 82 are ¼ inch in front and behind the axis of the plunger bar 42, at angles of about 14° offset from vertical.

The plunger bar 42 is positioned through the trucks 32 immediately above the top surface of each guide 56. Two transverse keyways 86, each sized to mate with the rectangular cross-section of the key 82, are formed in the top surface of each guide 56. One of the keyways 86 is toward the back of the guide 56, positioned longitudinally to coincide with the truck 32 contacting the rear guide bracket 70. The other keyway 86 is toward the front of the guide 56, positioned longitudinally to coincide with the truck 32 contacting the front guide bracket 70.

Figure 6:
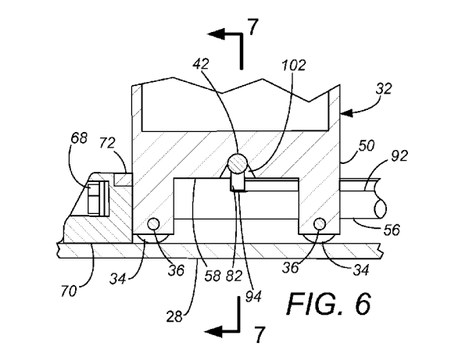
FIG. 6 is a cross-sectional view of the driver side bearing guide, taken along lines 6-6 in FIGS. 5 and 7.

With the preferred configuration shown, the plunger bar 42 and the attached keys 82 are perpendicular to the guides 56 and the direction of travel of the frame 30. Thus, the keys 82 provide planar abutment surfaces 88 (called out in FIG. 12) which butt up against an opposing planar abutment surface 90 (rear abutment surface 90 called out in FIG. 12) on the guide 56. During towing, the key 82 is the only (or at least primary, if an additional lock is used) structure preventing the frame 30 from rolling backwards on the guides 56. With the opposing abutment surfaces 88, 90 of the keys 82 and the guides 56 being planar and perpendicular to the direction of possible travel on the guides 56, the forces keeping the frame 30 stationary relative to the base 28 have no tendency to cause any binding of the key 82 relative to the guide 56. With planar opposing abutment surfaces 88, 90 perpendicular to the primary towing force, the considerable forces encountered over years of use cause no deformation of either the key 82 or the abutment surface 90 of the guide 56. The only moment caused by the towing force is on the keys 82 about the axis of the plunger bar 42. However, the key 82 is close in to the plunger bar 42, minimizing the moment arm of this moment. The plunger bar 42 is supported by the truck 32 on both sides of the key 82, minimizing bending of the plunger bar 42 under the force of the key 82. Further, because each key 82 has a rectangular cross-section (as shown in FIG. 6) mating into the rectangular cross-section of the keyway 86, each keyway 86 prevents its key 82 from rotating. This is in stark contrast to some prior art locking arrangements, wherein the towing forces induced either rotating or binding of the lock members.

A slide clearance recess 92 is preferably included in the guide 56 running longitudinally, to provide clearance between the key 82 and the guide 56 during repositioning of the frame 30 on the base 28. The slide clearance recess 92 preferably has a depth just below the height of the key 82 during sliding. The slide clearance recess 92 preferably includes a front dip 94 and a rear dip 96, to enable the plunger 42 with the key 82 to rotate at the front and rear ends of the slide clearance recess 92 but not along the middle section of the slide clearance recess 92. Alternatively for ease of manufacturing, the slide clearance recess 92 can be formed along its entire length to the same elevation as the front dip 94 and rear dip 96.

The plunger 42 is spring biased toward the engaged position. In the preferred embodiment, a compression spring 98 is used against a wider diameter section 100 of the plunger bar 42 to bias the lock 76 toward the engaged position. The preferred spring 98 requires about 15 pounds of force to disengage the lock 76. If desired, sections of the plunger bar 42 can be colored to enable quicker visual identification of whether the plunger bar 42 is in the engaged or disengaged position. For instance, a green marking may be visible to the right of the truck(s) 32 when the plunger bar 42 is in the engaged position. When the plunger bar 42 is retracted leftward to the disengaged position, the green marking is pulled into the truck(s) 32 and a red marking (which had been inside the truck(s) 32) is visible to the left of the truck(s) 32. If desired, a further safety lock (not shown) may be provided which prevents any undesired movement of the lock 76 from the engaged position.

Operation of the hitch 20 and lock 76 are explained particularly with reference to the sequence of views shown in FIGS. 6-13. In FIGS. 1-7, the hitch 20 is shown in the fore (highway towing) position. While in this position, the towed load is further forward on the towed vehicle, better positioning the towed load relative to the towing vehicle for towing at highway speeds but perhaps preventing very sharp turns. When the operator desires to proceed with tight maneuvering such as during parking, the operator disengages any safety lock (not shown) and then pulls on the handle 78, removing both keys 82 to the left of their associated keyways 86, i.e., from the position shown in FIG. 7 to the position shown in FIG. 8. If the operator immediately releases pressure on the handle 78 after this first movement, the compression spring 98 will cause the plunger bar 42 to move to the right, reengaging the keys 82 into their associated keyways 86.

Figure 9:
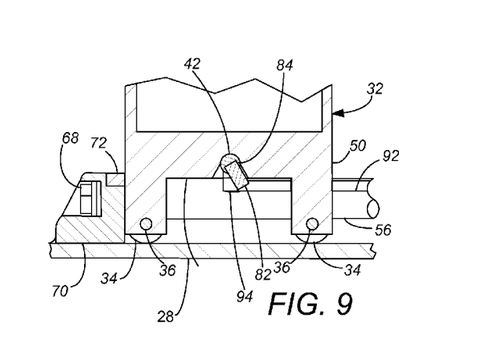
FIG. 9 is a cross-sectional view similar to FIG. 6 showing the retracted lock bar after rotation to keep the hitch free for lateral movement.

Rather than immediately release pressure however, the operator turns the handle 78 about 30° counter-clockwise to the position shown in FIG. 9. This rotates the key 82 through the front dip 94 of the slide recess 92 and up out of alignment with the keyway 86. A shoulder 102 is provided on the body of the truck 32 to provide a stop surface for the right side of the key 82 when the key 82 is rotated. The slide recess 92 is deep enough on the guide 56 to provide clearance on the right side of the key 82. When the operator releases pressure on the handle 78 after this rotation, the shoulder 102 prevents the key 82 from contacting the guide 56 and/or from reentering the fore (highway towing) keyway 86.

Next the operator returns to the cab of the towing vehicle and slowly drives forward. As the base 28 moves forward, the frame 30 is held in place due to the towed load. The key 82 moves rearwardly along in the slide recess 92. Once the truck 32 begins to move relative to the guide 56 so the key 82 is past the front dip 94, the slide recess 92 and the shoulder 102 of the truck 32 jointly function to prevent any further significant clockwise or counterclockwise rotation of the handle 78, until the key 82 is back in either the front or rear dip 94, 96.

Figure 10:
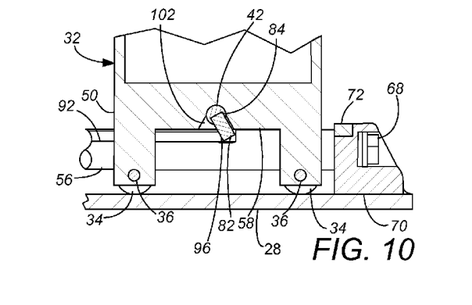
FIGS. 10 and 11 are cross-sectional views similar to FIGS. 6 and 9 but showing lateral movement of the hitch to the rear end of the bearing guide.
Figure 11:
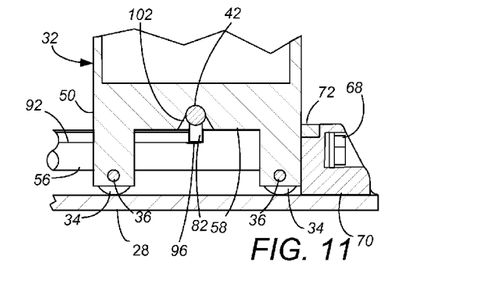

As shown in FIG. 10, just before the trucks 32 hit the rear guide brackets 70, the corner of the key 82 contacts the end of the slide recess 92. The force of the towed load is amply strong enough that the key 82 rotates downward, turning the plunger bar 42 and attached handle 78 clockwise the full 30° until the key 82 moves through the rear dip 96 and aligns with the rear (tight maneuvering) keyway 86 and the trucks 32 hit the rear guide brackets 70. Under the force of the compression spring 98, the plunger bar 42 and attached keys 82 snap into engagement with the rear (tight maneuvering) keyway 86 (i.e., back to the cross-sectional view shown in FIG. 7). The operator checks to be sure that the handle 78 has returned to the upright position and the key 82 has engaged into the rear (tight maneuvering) keyway 86. The operator can then reengage any safety lock on the plunger bar 42.

Note that, with the frame 30 in this rearward towing position, the keys' engagement into the keyways 86 is the only structure preventing forward movement of the frame 30 relative to the base 28 during braking with the load. To withstand the forwardly directed forces the towed load may impart on the hitch 20 during braking, the key 82 should be very strong, and should be close in to the axis of the plunger bar 42 (thereby minimizing the moment placed on the plunger bar 42. Further, the key 82 of the preferred embodiment is supported all along its length on the plunger bar 42, and the plunger bar 42 is supported by the truck 32 on both sides of the guide 56. Thus, the keyed engagement into the keyway 86 is much more robust than prior art locking arrangements which thread an end of a locking plunger into a hole.

When the operator desires to again tow the load over highway conditions, the procedure is basically reversed. The operator disengages any safety lock (not shown) and then pulls on the handle 78, removing both keys 82 to the left of their associated keyways 86 to the position shown in FIG. 8. If the operator immediately releases pressure on the handle 78 after this first movement, the compression spring 98 will cause the plunger bar 42 to move to the right, reengaging the keys 82 into their associated keyways 86.

Rather than immediately release pressure however, the operator turns the handle 78 about 30° clockwise. This rotates the key 82 up out of alignment with the keyway 86 and into the slide recess 92, but this time the key 82 is projecting forward of the plunger bar 42. When the operator releases pressure on the handle 78 after this rotation, the shoulder 102 prevents the key 82 from reentering the aft (tight maneuvering) keyway 86.

Figure 12:
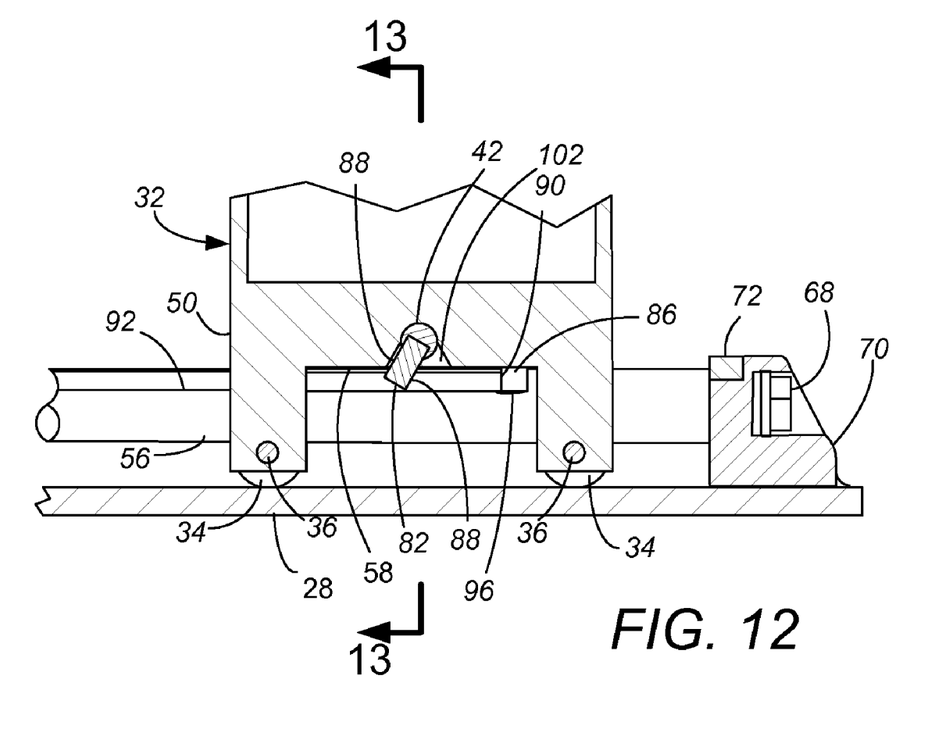
FIG. 12 is a cross-sectional view similar to FIGS. 6 and 9-11, but showing lateral movement of the hitch to the front end of the bearing guide, taken along lines 12-12 of FIG. 13.

Next the operator returns to the cab of the towing vehicle and slowly drives rearward. As the base 28 moves backward, the frame 30 is held in place due to the towed load. The key 82 slides forwardly along in the slide recess 92 as shown in FIGS. 12 and 13. Just before the trucks 32 hit the front guide brackets 70, the corner of the key 82 contacts the forward end of the slide recess 92. The force of the towed load is amply strong enough that the key 82 rotates downward, turning the plunger bar 42 and attached handle 78 counter-clockwise the full 30° until the key 82 aligns with the fore (highway towing) keyway 86 and the trucks 32 hit the front guide brackets 70. Under the force of the compression spring 98, the plunger bar 42 and attached keys 82 snap into engagement with the fore (highway towing) keyway 86 (back to the cross-sectional view shown in FIGS. 6 and 7). The operator checks to be sure that the handle 78 has returned to the upright position and the key 82 has engaged into the fore (highway towing) keyway 86. The operator can then reengage any safety lock on the plunger bar 42 and commence highway towing of the load.

Although the present invention has been described with reference to preferred embodiments, workers skilled in the art will recognize that changes may be made in form and detail without departing from the spirit and scope of the invention.

The invention claimed is;

1. A bearing guide for a moveable hitch, comprising:
    a base attachable relative to a towing vehicle, the base providing a roller bearing surface extending laterally;
    a frame for supporting a hitch structure, the frame having a roller riding on the roller bearing surface, such that the frame is laterally moveable relative to the base such that an operator can select either of at least two laterally separated towing positions of the hitch structure relative to the towing vehicle, the frame having a guide opening therein at an elevation above the roller; and
    a guide supported by the base at an elevation above the roller which mates into the guide opening in the frame, the guide being in a fixed position relative to the base during movement of the frame between the at least two laterally separated towing positions, the guide restricting lateral movement of the hitch structure between the at least two laterally separated towing positions to a single degree of freedom.

2. The bearing guide of claim 1, wherein the guide is supported on ends and suspended in a central section, wherein the guide opening encircles the guide.

3. The bearing guide of claim 1, wherein the guide comprises a keyway for locking the frame at a fixed lateral position.

4. The bearing guide of claim 3, further comprising:
    a plunger bar support by the frame, the plunger bar having an longitudinal axis extending transversely to the guide and being supported on both sides of the guide, the plunger bar being moveable along its longitudinal axis;
    a key extending from the plunger bar and positioned to mate with the keyway, such that with the plunger bar in a first longitudinal position supported on both sides of the guide, the key is in the keyway and locks the frame at a fixed lateral position, and with the plunger bar at a second longitudinal position supported on both sides of the guide, the key is removed from the keyway to permit the frame to be laterally moved along the guide.

5. The bearing guide of claim 4, wherein the plunger bar is spring biased toward the first longitudinal position.

6. The bearing guide of claim 5, wherein the plunger bar is pivotable about its longitudinal axis, the plunger bar having a first pivot position wherein the key is alignable with the keyway and a second pivot position wherein the key is out of alignment with the keyway, such that the plunger bar can be moved longitudinally against the spring bias to its second longitudinal position removing the key from the keyway, and then pivoted to the second pivot position and released with the key held out of the keyway to permit the frame to be laterally moved along the guide.

7. The bearing guide of claim 6, further comprising a sliding recess for receiving the key in the second pivot position during lateral movement of the frame along the guide.

8. The bearing guide of claim 7, wherein the sliding recess is provided on the guide.

9. The bearing guide of claim 7, wherein the sliding recess comprises a pivoting stop which, when the frame moves along the guide, pivots the plunger bar and attached key for engagement with a second locked position.

10. The bearing guide of claim 1, wherein the guide is positioned over the roller.

11. The bearing guide of claim 1, comprising a plurality of guides extending in a parallel relationship.

12. A locking moveable hitch, comprising:
a base attachable relative to a towing vehicle;
a hitch structure supported by the base so as to be laterally moveable with respect to the base and the towing vehicle, the hitch structure being adapted for releasable attachment to a towed load;
a plunger bar support by one of the base and the hitch structure, the plunger bar having a longitudinal axis and being moveable along its longitudinal axis;
a key fixed to a middle section of the plunger bar for movement with the plunger bar, with the plunger bar being supported at longitudinal separated positions on both sides of the key; and
a keyway defined in the other of the base and the hitch structure, the keyway receiving the key to provide a positive stop locking the hitch structure against movement when the key is in the keyway, wherein pulling or pushing the plunger bar along its longitudinal axis moves the key into and out of the keyway.

13. A locking moveable hitch, comprising:
a base attachable relative to a towing vehicle;
a hitch structure supported by the base so as to be laterally moveable in a movement direction with respect to the base and the towing vehicle, the hitch structure being adapted for releasable attachment to a towed load;
a plunger bar support by one of the base and the hitch structure, the plunger bar extending transversely to the movement direction;
a key fixed to a middle section of the plunger bar movement with the plunger bar, with the plunger bar being supported at longitudinal separated positions on both sides of the key; and at least two keyway defined in the other of the base and the hitch structure, each keyway receiving the key to provide a positive stop locking the hitch structure against movement when the key is in the keyway, wherein the key can be transversely moved and then turned in a two step movement to a position out of the keyway enabling the hitch structure to be laterally moved relative to the base.

14. A bearing guide for a moveable hitch, comprising:
a base attachable relative to a towing vehicle;
a frame for supporting a hitch structure;
a coupling between the frame and the base which allows the frame to move laterally relative to the base in a direction of travel such that an operator can select either of at least two laterally separated towing positions of the frame relative to the base; and
a moveable lock selectively preventing lateral movement of the frame relative to the base, the lock providing opposing abutment surfaces which are planar and perpendicular to the direction of travel, the opposing abutment surfaces transmitting a towing force during use of the bearing guide, wherein the lock comprises:
a plunger bar support by one of the base and the frame, the plunger bar having a longitudinal axis extending parallel to the opposing abutment surfaces of the lock, the plunger bar being moveable along its longitudinal axis;
a key fixed to a middle section of the plunger bar for movement with the plunger bar, with the plunger bar being supported at longitudinally separated positions on both sides of the key, the key providing a first of the opposing abutment surfaces; and
a keyway defined in the other of the base and the hitch structure, the keyway receiving the key to provide a positive stop locking the hitch structure against movement when the key is in the keyway, the keyway providing a second of the opposing abutment surfaces, wherein pulling or pushing the plunger bar along its longitudinal axis moves the key into and out of the keyway.

15. The bearing guide of claim 13, further comprising:
a spring providing a spring force which biases the key in a direction against only one of the two step movement; and
a shoulder for the key supporting the spring force during lateral movement of the hitch structure;
with the spring force automatically moving the key into one of the keyways when the hitch structure completes its laterally movement to a different towing position relative to the base.

* * * * *

UNITED STATES PATENT AND TRADEMARK OFFICE
CERTIFICATE OF CORRECTION

PATENT NO. : 7,584,982 B2  
APPLICATION NO. : 11/758430  
DATED : September 8, 2009  
INVENTOR(S) : Benjamin D. Fisher Page 1 of 1

It is certified that error appears in the above-identified patent and that said Letters Patent is hereby corrected as shown below:

At Col. 10, line 51, delete "an", and insert therefore --a--.

At Col. 11, line 26, delete "support", and insert therefore --supported--.

At Col. 11, line 31, delete "longitudinal", and insert therefore --longitudinally--.

At Col. 11, line 45, delete "support", and insert therefore --supported--.

At Col. 11, line 48, between "bar" and "movement", insert --for--.

At Col. 11, line 50, delete "longitudinal", and insert therefore --longitudinally--.

At Col. 12, line 1, delete "keyway", and insert therefore --keyways--.

Signed and Sealed this

Thirteenth Day of October, 2009

David J. Kappos
*Director of the United States Patent and Trademark Office*